(12) United States Patent
Kataoka

(10) Patent No.: US 7,922,935 B2
(45) Date of Patent: Apr. 12, 2011

(54) LIQUID CRYSTAL DISPLAY DEVICE

(75) Inventor: Shingo Kataoka, Tokyo (JP)

(73) Assignee: Sony Corporation, Tokyo (JP)

( * ) Notice: Subject to any disclaimer, the term of this patent is extended or adjusted under 35 U.S.C. 154(b) by 181 days.

(21) Appl. No.: 12/429,270

(22) Filed: Apr. 24, 2009

(65) Prior Publication Data

US 2009/0269515 A1 Oct. 29, 2009

(30) Foreign Application Priority Data

Apr. 24, 2008 (JP) ................. P2008-113697

(51) Int. Cl.
*C09K 19/00* (2006.01)
*C09K 19/06* (2006.01)
*C09K 19/52* (2006.01)
*G02F 1/1333* (2006.01)

(52) U.S. Cl. ......... 252/299.66; 252/299.01; 252/299.62; 430/20; 349/86; 349/182; 349/183; 349/184; 349/185; 349/186; 428/1.1; 428/1.3

(58) Field of Classification Search ............ 252/299.01, 252/299.6, 299.62, 299.66; 430/20; 428/1.1, 428/1.3; 349/182–186, 86
See application file for complete search history.

(56) References Cited

U.S. PATENT DOCUMENTS

| 6,977,704 | B2 | 12/2005 | Kataoka |
| 7,169,449 | B2 | 1/2007 | Nakanishi et al. |
| 7,820,072 | B2 * | 10/2010 | Hsieh et al. ............... 252/299.63 |
| 2005/0264737 | A1 * | 12/2005 | Kataoka et al. ............... 349/124 |

FOREIGN PATENT DOCUMENTS

| JP | 05-224187 | 9/1993 |
| JP | 06-160814 | 6/1994 |
| JP | 2000-347175 | 12/2000 |
| JP | 2002-357830 | 12/2002 |
| JP | 2003-307720 | 10/2003 |
| JP | 2005-024927 | 1/2005 |

OTHER PUBLICATIONS

Japanese Patent Office Action corresponding to Japanese Serial No. 2008-113697 dated Jul. 15, 2010.

* cited by examiner

*Primary Examiner* — Geraldina Visconti
(74) *Attorney, Agent, or Firm* — SNR Denton US LLP

(57) ABSTRACT

A liquid crystal display device being resistant to display unevenness without loss of responsivity and being capable of securing configurational stability is provided. A liquid crystal display device includes: a liquid crystal layer including liquid crystal molecules and a polymer compound including a structure represented by Chemical Formula 1; and a pair of substrates facing each other with the liquid crystal layer in between, Chemical Formula 1

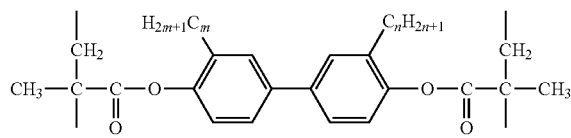

where m and n each are an integer of 1 to 4 both inclusive.

9 Claims, 8 Drawing Sheets

A1
SEALED

A2
SEALED

LIQUID CRYSTAL DISPLAY DEVICE

BACKGROUND OF THE INVENTION

1. Field of the Invention

The present invention relates to a liquid crystal display device including a liquid crystal layer sandwiched between a pair of substrates.

2. Description of the Related Art

Liquid crystal displays displaying images by driving liquid crystal display devices have a low profile, a light weight, and low power consumption, so the liquid crystal displays are widely used for not only image displays such as televisions or monitors but also information terminals such as digital cameras or cellular phones.

Such liquid crystal displays are classified into liquid crystal display systems (display modes) of the liquid crystal display devices, and a twisted nematic (TN) mode is well known. However, there is increasing interest in a vertical alignment (VA) mode, because the VA mode achieves a wider viewing angle than the TN mode.

In the VA mode, for example, liquid crystal molecules in a liquid crystal material has a negative dielectric constant anisotropy, that is, a property of having a smaller dielectric constant in a long axis direction of the molecules than that in a short axis direction thereof, and liquid crystal molecules aligned vertically to a substrate respond so as to be aligned horizontally to the substrate, thereby light is modulated and transmitted therethrough. In the VA mode, the liquid crystal molecules are aligned in any direction, so the alignment directions of the liquid crystal molecules vary, thereby responsivity to voltage declines. Therefore, to improve the responsivity, a rubbing process for controlling the alignment of liquid crystal molecules is performed. However, in a liquid crystal display device subjected to the rubbing process, scratches due to rubbing easily cause display unevenness, and unless alignment division for arranging a plurality of regions with different alignment directions of liquid crystal molecules is performed, it is difficult to secure a wide viewing angle. Therefore, a technique of controlling the alignment of liquid crystal molecules except for the rubbing process has been studied.

As the technique of controlling the alignment of liquid crystal molecules, for example, as illustrated in FIG. 12, a technique of arranging linear projections on a surface of a substrate is known. In a liquid crystal display device using the technique, a liquid crystal layer 500 including liquid crystal molecules 500A is sealed between a drive substrate 200 and a facing substrate 300. Electrodes 202 and 302, linear projections 410 not facing one another and alignment films 400 being laid over the electrodes 202 and 302 and the linear projections 410 are arranged on facing surfaces of the drive substrate 200 and the facing substrate 300. In the liquid crystal layer 500, in a state in which a voltage is not applied, the liquid crystal molecules 500A are aligned substantially vertically to surfaces of the alignment films 400. Therefore, while the liquid crystal molecules 500A in regions in proximity to the linear projections 410 are slightly tilted with respect to the surfaces of the drive substrate 200 and the facing substrate 300 (that is, a tilt angle is provided), the liquid crystal molecules 500A in other regions are aligned substantially vertically to the surfaces of the drive substrate 200 and the facing substrate 300. When a voltage is applied to the liquid crystal layer 500 in this state, the tilt of the liquid crystal molecules 500A in proximity to the linear projections 410 successively propagate to other liquid crystal molecules 500A, and these liquid crystal molecules 500A respond so as to be aligned substantially horizontally to the surfaces of the drive substrate 200 and the facing substrate 300.

However, in the liquid crystal display device illustrated in FIG. 12, there is a lag between a timing when the liquid crystal molecules 500A aligned vertically to the surfaces of the drive substrate 200 and the facing substrate 300 fall down in response to the application of a voltage and a timing when the liquid crystal molecules 500A in proximity to the linear projections 410 fall down in response to the application of a voltage. As a result, there is an issue that the response speed of the liquid crystal molecules 500A as a whole becomes slower. In particular, in a gray-scale change from black to an intermediate color, the change amount of an applied voltage is small, so the response speed becomes further slower.

Therefore, in the VA mode, techniques of slightly tilting liquid crystal molecules from a direction of normal to a substrate by a polymer material and keeping the liquid crystal molecules slightly tilted are known as described in Japanese Unexamined Patent Application Publication Nos. 2002-357830 and 2003-307720. More specifically, after a liquid crystal layer formed by adding a monomer having photopolymerizability is sandwiched between substrates, the liquid crystal layer is exposed to light under the application of a voltage for tilting liquid crystal molecules, to polymerize the monomer so as to form a polymer, thereby a pretilt angle is provided to the liquid crystal molecules, and a tilting direction of the liquid crystal molecules under no application of the voltage is predetermined.

SUMMARY OF THE INVENTION

However, in the case where monomers described in Japanese Unexamined Patent Application Publication Nos. 2002-357830 and 2003-307720 are used, while responsivity is improved, it is difficult to stably control the alignment of liquid crystal molecules. More specifically, in the case where an acrylate-based monomer is used, a formed polymer is deteriorated by driving a liquid crystal display device, thereby it is difficult to maintain the controlled alignment of the liquid crystal molecules for a long period. Moreover, it is necessary to add a large amount of the acrylate-based monomer to a liquid crystal layer, so display unevenness (uneven distributions of brightness and color saturation) due to nonuniform formation of the polymer easily occurs. Further, in the case where a monomer in which a methacrylate group is introduced into a biphenyl skeleton is used, while the formed polymer is resistant to deterioration, compatibility between the monomer and liquid crystal molecules is low, so the polymer is nonuniformly formed, thereby display unevenness easily occurs. Such an issue arises not only in the VA mode but also an IPS (In-Plane-Switching) mode or an FFS (Fringe Field Switching) mode. Therefore, a liquid crystal display device being resistant to display unevenness without loss of responsivity and having such high configurational stability that the controlled alignment of liquid crystal molecules is allowed to be stably maintained for a long period is desired.

It is desirable to provide a liquid crystal display device being resistant to display unevenness without loss of responsivity and being capable of securing configurational stability.

According to an embodiment of the invention, there is provided a liquid crystal display device including: a liquid crystal layer including liquid crystal molecules and a polymer compound including a structure represented by Chemical Formula 1; and a pair of substrates facing each other with the liquid crystal layer in between.

Chemical Formula 1

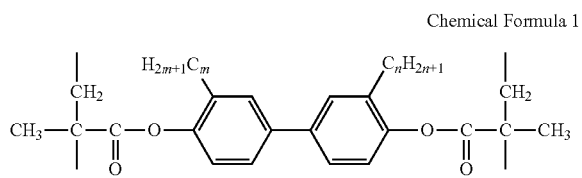

where m and n each are an integer of 1 to 4 both inclusive.

In the liquid crystal display device according to the embodiment of the invention, the polymer compound in the liquid crystal layer controls the alignment of liquid crystal molecules in proximity to the polymer compound. When the polymer compound includes the structure represented by Chemical Formula 1, the polymer compound is easily distributed more evenly in an in-plane direction along the substrates. In other words, the distribution of the polymer compound is less likely to be biased in the in-plane direction along the substrates. Moreover, even if a physical pressure is applied to the substrates, or even if the liquid crystal display device is exposed to a high-temperature environment, the controlled alignment of the liquid crystal molecules is favorably maintained, and deterioration such as, for example, burn-in is less likely to occur. Therefore, when a drive voltage is applied, the alignment of the liquid crystal molecules in the liquid crystal layer is rapidly changed according to an electrical field.

In the liquid crystal display device according to the embodiment of the invention, the polymer compound including the structure represented by Chemical Formula 1 is included, nonuniformity in the polymer compound is prevented, and the alignment of liquid crystal molecules in proximity to the polymer compound is stably controlled. Therefore, without loss of responsivity, the display unevenness is less likely to occur, and configurational stability may be secured.

Other and further objects, features and advantages of the invention will appear more fully from the following description.

DETAILED DESCRIPTION OF THE PREFERRED EMBODIMENTS

Preferred embodiments will be described in detail below referring to the accompanying drawings.

First Embodiment

Figure 1:
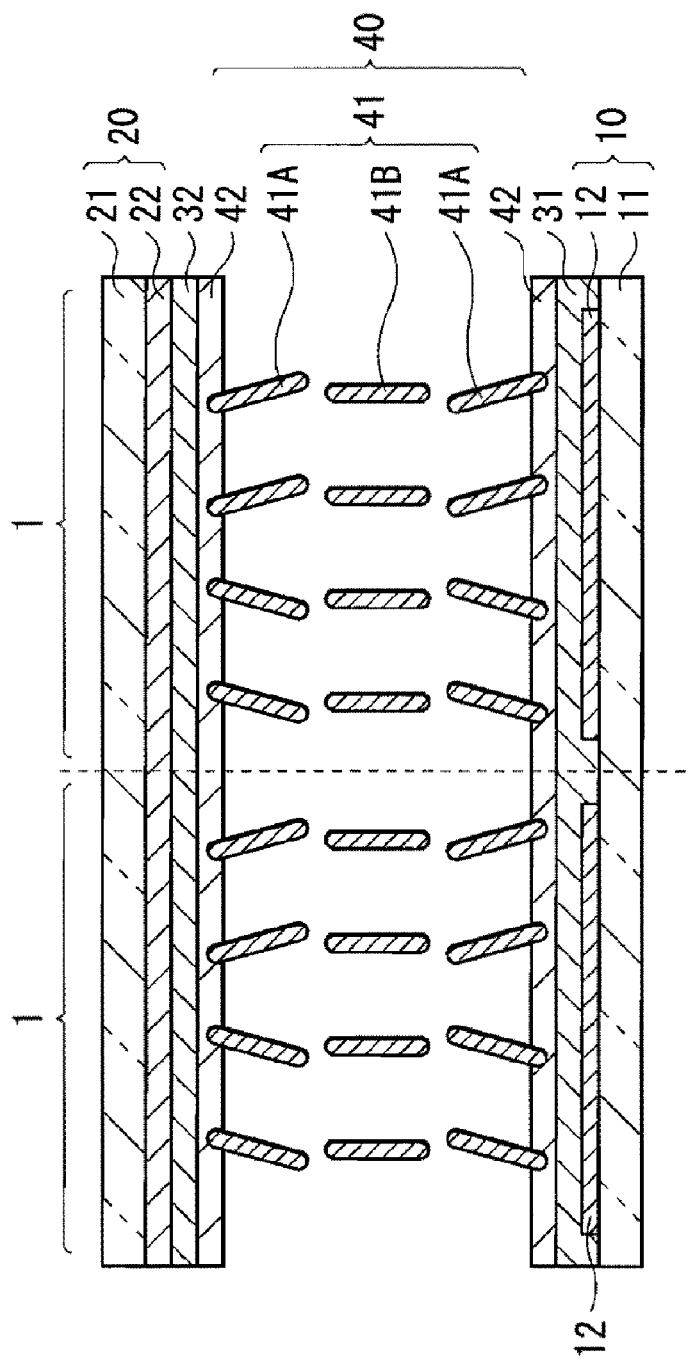
FIG. 1 is a schematic sectional view of a liquid crystal display device according to a first embodiment of the invention.

FIG. 1 is a schematic sectional view of a liquid crystal display device according to a first embodiment of the invention. The liquid crystal display device includes a plurality of pixels 1, and the liquid crystal display device includes a pixel electrode substrate 10 and a facing electrode substrate 20 which face each other, alignment films 31 and 32 which are arranged so as to be laid over surfaces facing each other of the pixel electrode substrate 10 and the facing electrode substrate 20, and a liquid crystal layer 40 sealed between the pixel electrode substrate 10 and the facing electrode substrate 20 with the alignment films 31 and 32 in between. The display mode of the liquid crystal display device is a so-called vertical alignment (VA) mode, and FIG. 1 illustrates a state in which a drive voltage is not applied (black display). The liquid crystal display device is a so-called transmissive liquid crystal display device, and a pair of polarizing plates (not illustrated) are arranged so that the pixel electrode substrate 10 and the facing electrode substrate 20 are sandwiched from outside between the pair of polarizing plates.

The pixel electrode substrate 10 has a configuration in which a pixel electrode 12 is arranged on a surface of a transparent substrate 11 on which a drive circuit (not illustrated) including a drive element is formed. The transparent substrate 11 is made of, for example, a transparent (light transmissive) material such as glass or plastic. The pixel electrode 12 is an electrode on one side for applying a voltage to the liquid crystal layer 40. Moreover, for example, a plurality of the pixel electrodes 12 are provided, and the pixel electrodes 12 form a matrix-like arrangement pattern. In other words, a potential is independently supplied to each of the pixel electrodes 12. The pixel electrode 12 is, for example, a transparent electrode having light transmittance, and is made of, for example, a transparent electrode material such as indium tin oxide (ITO).

The facing electrode substrate 20 has a configuration including a color filter (not illustrated) which includes red (R), green (G) and blue (B) filters arranged in stripes, and a common electrode 22 which is arranged almost all over an effective display region on the transparent substrate 21. The transparent substrate 21 is made of, for example, the same material as that of the transparent substrate 11. The common electrode 22 is an electrode on the other side for applying a voltage to the liquid crystal layer 40, and is made of, for example, a transparent electrode material as in the case of the pixel electrode 12.

The alignment films 31 and 32 are vertical alignment films which align liquid crystal molecules 41 included in the liquid crystal layer 40 in a vertical direction with respect to a substrate surface, and are made of, for example, an organic material such as polyimide. The alignment films 31 and 32 may be subjected to a process of controlling the alignment of liquid crystal molecules 41 such as rubbing.

The liquid crystal layer 40 includes the liquid crystal molecules 41 and a polymer compound 42. The liquid crystal molecules 41 have a negative dielectric constant anisotropy, and have a rotationally symmetrical shape about a long axis and a short axis which are orthogonal to each other as central axes.

The polymer compound 42 is preferably present in proximity to at least one of the alignment films 31 and 32, and the polymer compound 42 is more preferably arranged so as to be fixed or adhered to a surface of at least one of the alignment films 31 and 32. In this case, the polymer compound 42 is arranged on both of surfaces of the alignment films 31 and 32. The polymer compound 42 controls the alignment of liquid crystal molecules 41 (liquid crystal molecules 41A) in proximity to the polymer compound 42 so as to maintain the liquid crystal molecules 41, and the polymer compound 42 includes one kind or two or more kinds of structures represented by Chemical Formula 2. Thereby, the polymer compound 42 is substantially uniformly formed at interfaces between the liquid crystal layer 40 and the alignment films 31 and 32, and a property of maintaining the alignment of liquid crystal molecules 40A (an alignment control force) is improved, so without loss of responsivity, display unevenness is less likely to occur, and configurational stability is secured.

Chemical Formula 2

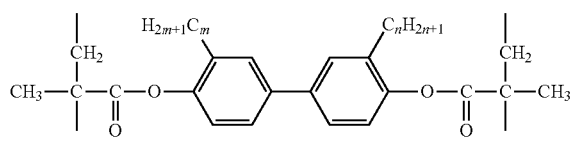

where m and n each are an integer of 1 to 4 both inclusive.

The structure represented by Chemical Formula 2 is a part of a structure formed by polymerizing a polymerizable compound including a methacrylate group and a biphenyl skeleton into which an alkyl group is introduced. As long as m and n in Chemical Formula 2 each are an integer of 1 to 4 both inclusive, m and n may be the same as or different from each other, and the alkyl group may be a straight-chain alkyl group or an alkyl group having a branch. The number of carbon atoms in the alkyl group is within a range of 1 to 4 both inclusive (m and n each are within a range of 1 to 4 both inclusive), because when the number of carbon atoms is out of the range, the alignment control force and uniformity in the polymer compound 42 easily decline. Preferably, m and n are the same as each other, and in this case, m and n each are preferably within a range of 1 to 3 both inclusive. In particular, m and n each are preferably 1 or 2, and more preferably 1, because a higher effect is obtained.

Examples of the structure represented by Chemical Formula 2 include structures represented by Chemical Formula 3. The polymer compound 42 may be formed by repeatedly bonding structures of one kind selected from them, or by bonding structures of a plurality of kinds selected from them. Among them, The polymer compound 42 preferably includes the structures represented by Chemical Formulas 3(1) to 3(3), and in particular, the polymer compound 42 preferably includes the structure represented by Chemical Formula 3(1), because display unevenness is less likely to occur and configurational stability is secured, and the alignment control force is high, so high responsivity is obtained.

Chemical Formula 3

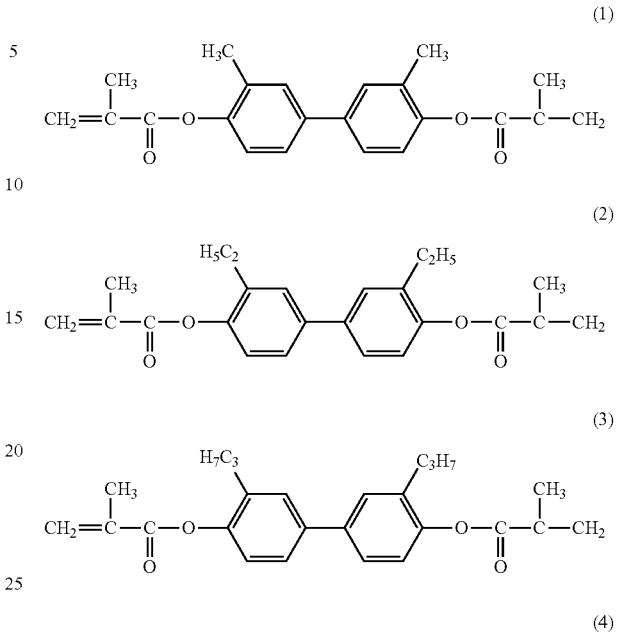

Moreover, the polymer compound 42 may include any other structure in addition to the structure represented by Chemical Formula 2, and in particular, the polymer compound 42 preferably includes a structure represented by Chemical Formula 4, because a higher effect is obtained. More specifically, in a polymer compound including the structure represented by Chemical Formula 4 but not including the structure represented by Chemical Formula 2, the alignment control force is high, but the polymer compound is easily formed nonuniformly, and the distribution of the polymer compound is easily biased. However, when the polymer compound 42 includes the structure represented by Chemical Formula 2 and the structure represented by Chemical Formula 4, while high alignment control force is maintained, the polymer compound 42 is formed more uniformly in an in-plane direction of the pixel electrode substrate 10 and the facing electrode substrate 20, and it becomes easy to uniformly distribute the polymer compound 42. Therefore, a higher effect is obtained.

Chemical Formula 4

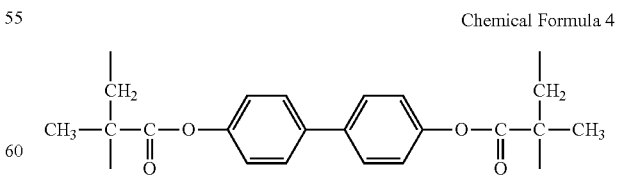

Preferably, the polymer compound 42 is chemically bonded to surfaces of the alignment films 31 and 32, because configurational stability is improved.

Figure 2:
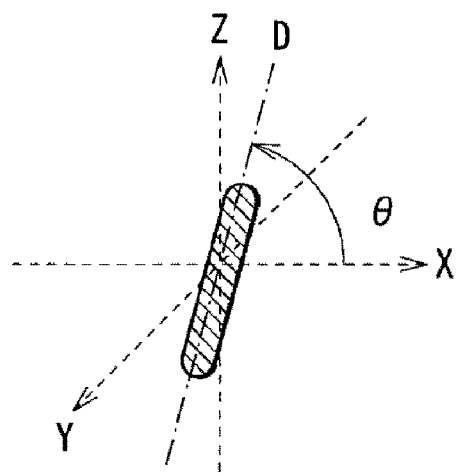
FIG. 2 is a schematic view for describing a pretilt angle of a liquid crystal molecule.

In the liquid crystal layer 40, the liquid crystal molecules 41 may be classified into liquid crystal molecules 41A of which the alignment is controlled so as to be maintained by the polymer compound 42 in proximity to interfaces with the alignment films 31 and 32, and liquid crystal molecules 41B other than the liquid crystal molecules 41A. The liquid crystal molecules 41B are positioned in a middle region in a thickness direction of the liquid crystal layer 40, and in a state in which a drive voltage is not applied, the long axis direction of the liquid crystal molecules 41B is aligned substantially vertically to the surfaces of the transparent substrates 11 and 21. On the other hand, a pretilt angle θ is provided to the liquid crystal molecules 41A by the polymer compound 42, and the long axis direction of the liquid crystal molecules 41A is tilted with respect to the surfaces of the transparent substrates 11 and 21. As illustrated in FIG. 2, the pretilt angle θ in the embodiment means a tilt angle of a long axis direction D of the liquid crystal molecule 41 (41A or 41B) with respect to an XY plane in the case where the surfaces of the transparent substrates 11 and 21 each are an XY plane and a direction vertical to the XY plane is Z.

In the liquid crystal layer 40, the pretilt angle θ of the liquid crystal molecules 41A is preferably within a range of greater than 88° to smaller than 90° (88°<θ<90°), because in a state in which a drive voltage is not applied (black display), the light transmission amount is reduced, and excellent contrast is maintained, and the response time is reduced.

The liquid crystal display device may be manufactured by the following steps, for example.

First, for example, the pixel electrode substrate 10 in which the pixel electrodes 12 are arranged in a predetermined pattern on the transparent substrate 11 and the facing electrode substrate 20 in which the common electrode 22 is arranged on the transparent substrate 21 are prepared. Next, the alignment films 31 and 32 are formed on the surfaces of the pixel electrodes 12 and the common electrode 22 by coating the surfaces of the pixel electrodes 12 and the common electrode 22 with a vertical alignment agent or printing and firing vertical alignment films on the substrates.

On the other hand, as a material of the liquid crystal layer 40, a liquid crystal material is prepared by mixing the liquid crystal molecules 41 and a compound represented by Chemical Formula 5 as a polymerizable compound (a monomer) which forms the structure represented by Chemical Formula 2 by polymerization. Examples of the compound represented by Chemical Formula 5 include compounds represented by Chemical Formula 6. Only one kind or a mixture of a plurality of kinds selected from them may be used. Moreover, if necessary, a compound represented by Chemical Formula 7 as a monomer which forms the structure represented by Chemical Formula 4 by polymerization is preferably mixed with the liquid crystal material, because a higher effect is obtained. At this time, if necessary, an ultraviolet absorber, a photopolymerization initiator or the like may be added to the liquid crystal material.

Chemical Formula 5

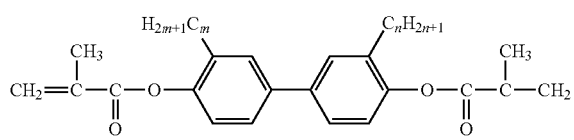

where m and n each are an integer of 1 to 4 both inclusive.

Chemical Formula 6

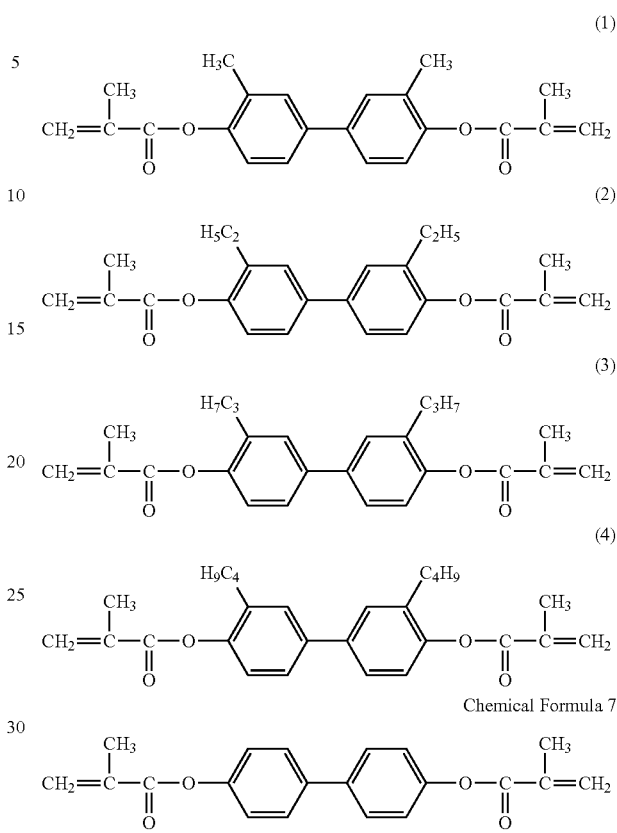

Chemical Formula 7

Next, on one of the surfaces on which the alignment films 31 and 32 are formed of the pixel electrode substrate 10 and the facing electrode substrate 20, a spacer projection for keeping a cell gap, for example, a columnar projection is formed of a resist, or a plastic beads or the like are sprayed. In addition, a seal section is formed by printing the seal section by, for example, screen printing through the use of a sealing agent such as an epoxy adhesive, or by coating with the sealing agent by a dispenser. After that, the pixel electrode substrate 10 and the facing electrode substrate 20 are bonded together with the spacer projection and the seal section in between so as to face each other. Next, the seal section except for an injection opening (a sealing opening) for injecting the liquid crystal material is cured by heating or the like. Next, the above-described liquid crystal material is injected into a space between the pixel electrode substrate 10 and the facing electrode substrate 20 through the injection opening, and then the sealing opening is sealed with the sealing agent or the like.

Figure 3:
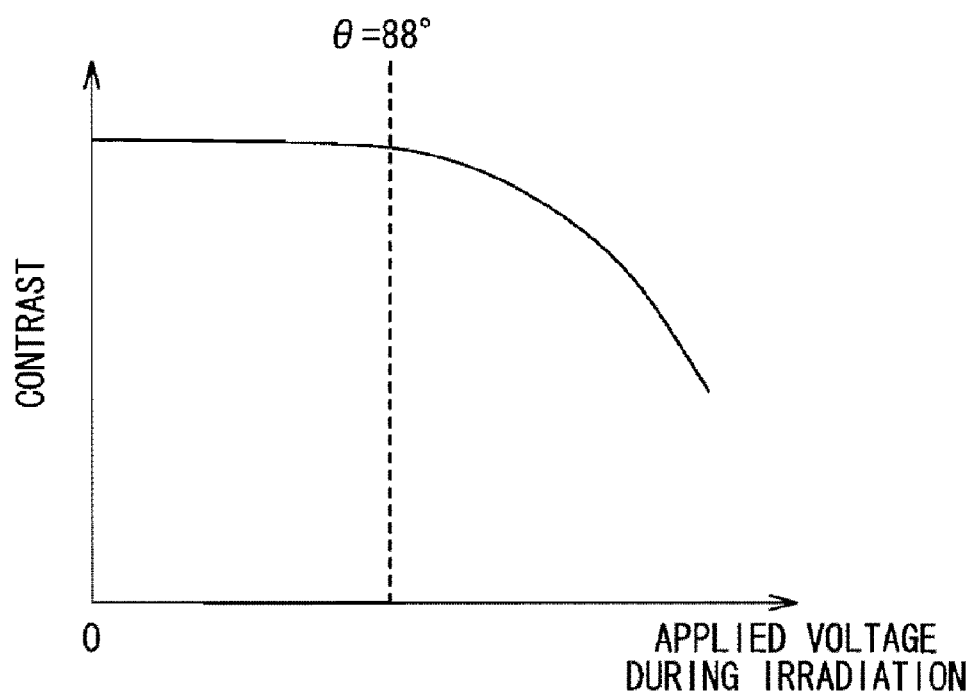
FIG. 3 is a schematic view illustrating a relationship between an applied voltage when a polymer compound is formed and contrast.

Next, a predetermined voltage is applied between the pixel electrode 12 and the common electrode 22. Thereby, the liquid crystal molecules 41 are aligned so as to be tilted with respect to the surfaces of the transparent substrates 11 and 21 in a predetermined direction from a direction of normal to the transparent substrates 11 and 21. The tilt angles of the liquid crystal molecules 41 at this time and the pretilt angle θ provided to the liquid crystal molecules 41A in an after-mentioned step are substantially equal to each other. Therefore, the pretilt angle θ is controllable by appropriately adjusting the magnitude of the voltage. FIG. 3 illustrates a relationship between the voltage and contrast in this case. As illustrated in FIG. 3, the voltage is preferably applied so that the pretilt angle θ of the liquid crystal molecules 41A falls in a range of greater than 88° to smaller than 90°, because in the case where the voltage is applied so that the pretilt angle θ becomes 88° or less, the contrast may considerably decline. Moreover, in the case where the pretilt angle θ is 90°, the response speed becomes low, thereby responsivity may be impaired.

Next, while the above-described state in which the predetermined voltage is applied is kept, the liquid crystal layer 40 is irradiated with ultraviolet light from the outside of at least one of the pixel electrode substrate 10 and the facing electrode substrate 20 to polymerize the monomer in the liquid crystal material, thereby the polymer compound 42 including the structure represented by Chemical Formula 2 is formed on the surfaces of the alignment films 31 and 32. Thereby, the liquid crystal display device illustrated in FIG. 1 is completed.

In the above-described manufacturing method, the polymer compound 42 is formed through the use of the compound represented by Chemical Formula 5 (the monomer), so display unevenness caused by the manufacturing method is less likely to occur in the liquid crystal display device.

Figure 4:
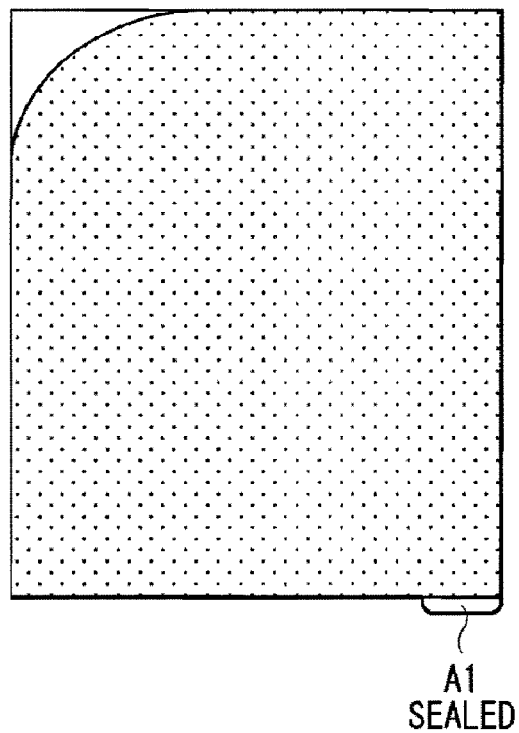
FIG. 4 is a schematic view for describing display unevenness.

Herein, display unevenness in the liquid crystal display device will be described below referring to FIGS. 4 and 5. FIG. 4 schematically illustrates display unevenness in the case where a gray scale is displayed. Display unevenness illustrated in FIG. 4 easily occurs in the case where a large amount of the monomer is mixed with the liquid crystal material, the case where a monomer with low compatibility with liquid crystal molecules is used, the case where a low-molecular-weight photopolymerization initiator is used, or the like. In this case, it is considered that the polymer compound is nonuniformly formed by a relationship between the position of a sealing opening A1 through which the liquid crystal material is injected and a region where display unevenness occurs. More specifically, by an effect of adsorption chromatography during injection of the liquid crystal material, in the sealed liquid crystal material, composition nonuniformity occurs. That is, the component ratio of the liquid crystal material in a position in proximity to the sealing opening A1 differs from the component ratio of the liquid crystal material in a position far from the sealing opening A1. As a result, it is considered that the polymer compound is not uniformly formed in the liquid crystal layer, and nonuniformity in the alignment control force in the device occurs, thereby display unevenness occurs. Examples of the case where such display unevenness occurs include the case where a large amount of an after-mentioned monomer represented by Chemical Formula 9 is mixed with the liquid crystal material, the case where the compound represented by Chemical Formula 7 is singly used, the case where as the photopolymerization initiator, 1-hydroxy-cyclohexyl-phenyl-ketone is used, and the like.

Figure 5:
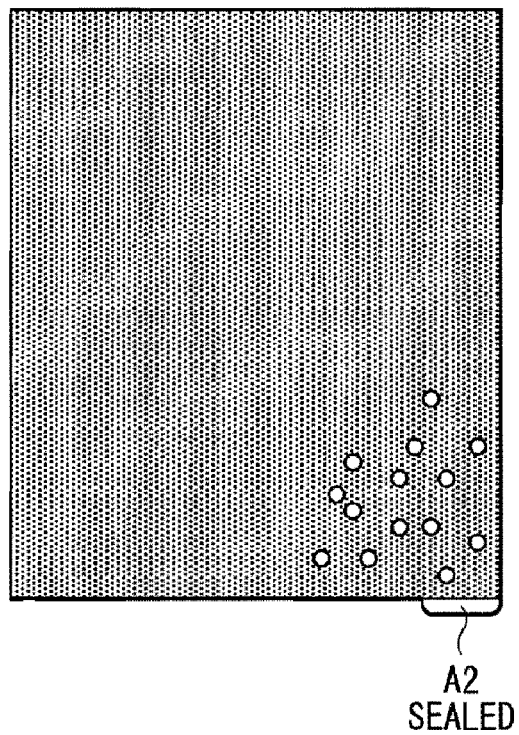
FIG. 5 is a schematic view for describing another display unevenness.

Moreover, FIG. 5 schematically illustrates display unevenness in the case where black display is performed. The display unevenness illustrated in FIG. 5 occurs in the case where a monomer with low compatibility with liquid crystal molecules is used, and it is considered that the polymer compound is locally formed by a relationship between the position of a sealing opening A2 through which the liquid crystal material is injected and a region where display unevenness occurs, thereby the polymer compound is not uniformly formed. In other words, it is considered that the monomer included in the liquid crystal material is not compatible with the liquid crystal molecules, and is not dispersed in the liquid crystal material, thereby the monomer is associated, and as a result, the polymer compound is locally formed, and the local formation of the polymer compound causes a bright spot during black display. Examples of such a monomer include the compound represented by Chemical Formula 7 and the like.

In addition, display unevenness may occur by deterioration in the polymer compound which controls the alignment of liquid crystal molecules in addition to the above-described cases. More specifically, the polymer compound is decomposed and ionized by driving the liquid crystal display device, and the ionized resolvent is absorbed or adhered to the alignment film, that is, so-called burn-in occurs, thereby display unevenness may occur.

In the liquid crystal display device according to the embodiment, when a drive voltage is applied between the pixel electrode 12 and the common electrode 22 on the basis of image data, the liquid crystal molecules 41 in the liquid crystal layer 40 respond to fall down, and light is modulated and transmitted, thereby display is performed. At this time, in the liquid crystal layer 40, the alignment of the liquid crystal molecules 41A in proximity to the polymer compound 42 is controlled so that the liquid crystal molecules 41A has a predetermined pretilt angle θ, so compared to a VA mode liquid crystal display device in related art which controls the alignment of liquid crystal molecules by projections or slits, responsivity is improved.

Moreover, in the liquid crystal display device, the polymer compound 42 includes the structure represented by Chemical Formula 2, so compared to the case where a polymer compound not including the structure represented by Chemical Formula 2 and including the structure represented by Chemical Formula 4 or the structures represented by Chemical Formulas 8(1) to 8(5) is used to control the alignment of liquid crystal molecules, without loss of responsivity, the above-described display unevenness is less likely to occur. Further, even if a physical pressure is applied from the outside the transparent substrates 11 and 12, the alignment of the liquid crystal molecules 41A controlled by the polymer compound 42 is easily returned, and even if the liquid crystal display device is exposed to a high-temperature environment, the alignment of the liquid crystal molecules 41A are favorably maintained, and deterioration such as so-called burn-in is less likely to occur. Therefore, configurational stability is secured. In addition, the monomers used to form the polymer compound including the structures represented by Chemical Formulas 8(1) to 8(5) are compounds represented by Chemical Formulas 9(1) to 9(5).

Chemical Formula 8

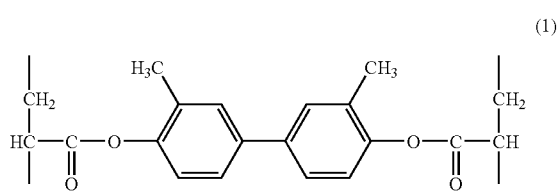

(1)

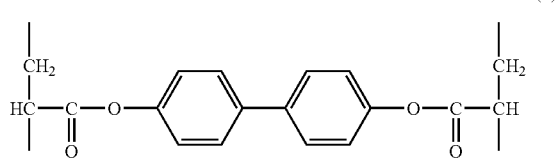

(2)

-continued

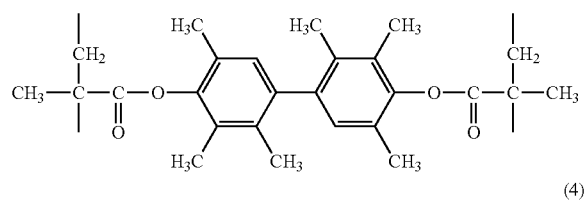

(3)

(4)

(5)

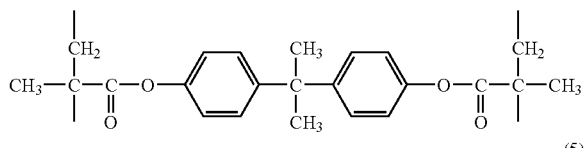

Chemical Formula 9

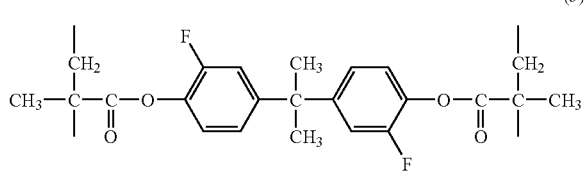

(1)

(2)

(3)

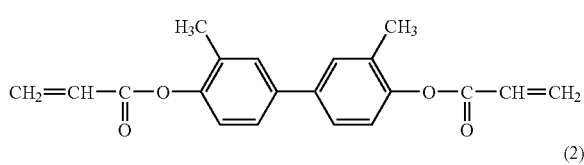

(4)

(5)

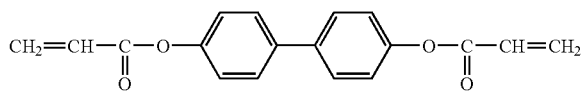

Moreover, in the liquid crystal display device, when the polymer compound further includes the structure represented by Chemical Formula 4, display unevenness is less likely to occur, and higher configurational stability is secured, and high responsivity is obtained. Further, when the pretilt angle θ of the liquid crystal molecules 41A is within a range of 88°<θ<90°, in addition to the above-described effects, while high contrast is maintained, the response time is reduced.

In the liquid crystal display device according to the embodiment, a configuration in which the polymer compound 42 is fixed to the surfaces of the alignment films 31 and 32 is described; however, it is only necessary for the polymer compound 42 to be included in the liquid crystal layer 40.

Figure 6:
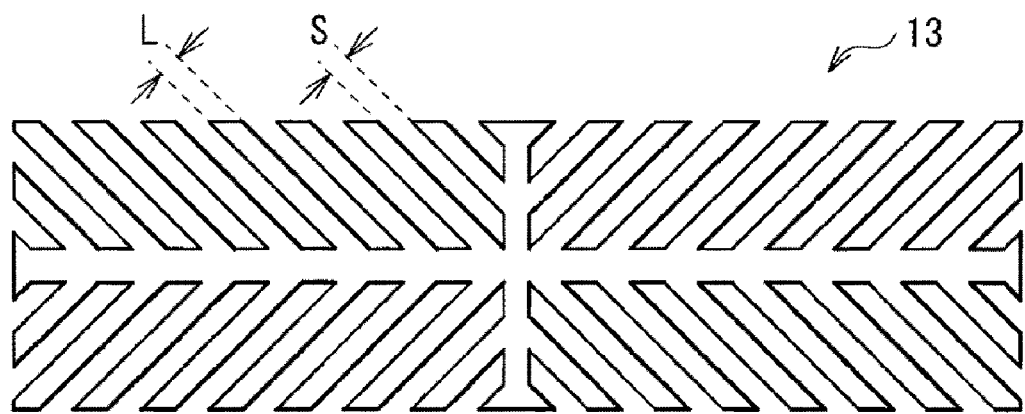
FIG. 6 is a schematic plan view illustrating a modification of a pixel electrode illustrated in FIG. 1.

Moreover, in the liquid crystal display device according to the embodiment, the pixel electrode 12 is arranged on one surface of the transparent substrate 11; however, a pixel electrode 13 having a plurality of slits at intervals as illustrated in FIG. 6 may be used. The pixel electrode 13 includes a plurality of slits including lines (L) and spaces (S), and has a so-called fishbone shape. Thereby, in the liquid crystal display device using the pixel electrode 13, light transmittance in the case where a linear polarizing plate is used is increased, and high contrast is achieved by using the linear polarizing plate. In the pixel electrode 13, the widths of L and S are arbitrarily set. In the liquid crystal display device using the pixel electrode 13, for example, compared to a liquid crystal display device necessary to use a circular polarizing plate (for example, an after-mentioned liquid crystal display device illustrated in FIG. 8), in the case of L=2.5 μm and S=2.5 μm, the light transmittance is approximately 80%, and the contrast is approximately 4000 which is equivalent to approximately four times higher than the contrast in the liquid crystal display device illustrated in FIG. 8. Moreover, compared to the liquid crystal display device illustrated in FIG. 8 in the same manner, in the case of L=4.0 μm and s=4.0 μm, the light transmittance is approximately 70%, and in the case where L and S are wider than 4.0 μm, the liquid crystal molecules 41 are misaligned and the alignment of the liquid crystal molecules 41 becomes nonuniform, thereby light transmittance tends to rapidly decline. Therefore, L and S are preferably 4.0 μm or less.

Figure 7:
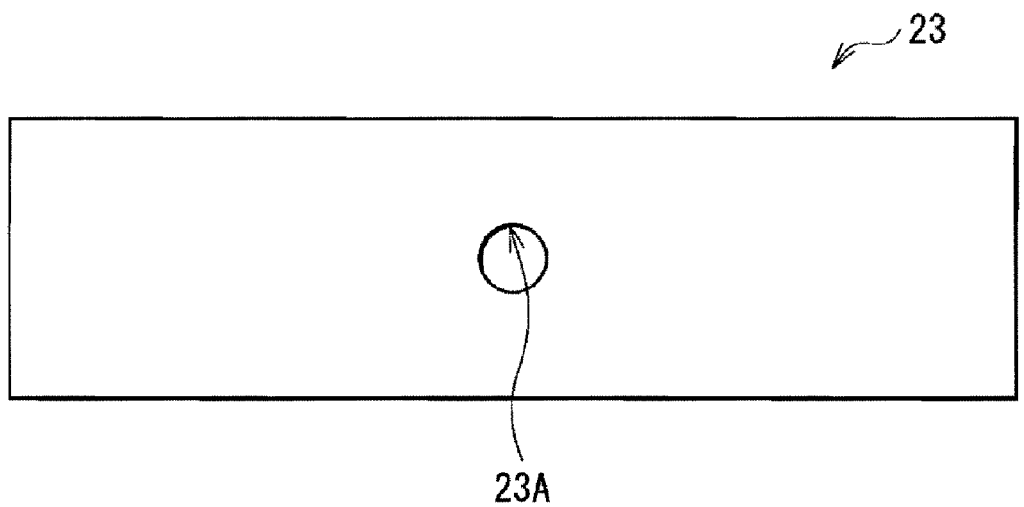
FIG. 7 is a schematic plan view illustrating a modification of a common electrode illustrated in FIG. 1.

In the embodiment, the common electrode 22 is arranged on one surface of the transparent substrate 21, and the common electrode 22 preferably includes an aperture or a notch. Thereby, the alignment of the liquid crystal molecules 41 is further stabilized. Moreover, the alignment of the liquid crystal molecules 41 is stabilized even in a state before the polymer compound 42 is formed, so when the polymer compound 42 is formed, the pretilt angle θ of the liquid crystal molecules 41A is easily controlled. As such a common electrode, a common electrode 23 including an aperture illustrated in FIG. 7 is used. The common electrode 23 includes, for example, a circular aperture section 23A in a central part of a region facing the pixel electrode 12. In FIG. 7, the aperture section 23A with a circular shape is illustrated; however, the aperture section 23A may have a square shape such as a slit or a polygonal shape, and as long as the alignment of the liquid crystal molecules 41 is stabilized, the aperture section 23A may have an arbitrary shape.

Next, a modification of the liquid crystal display device according to the first embodiment will be described below. Like components are denoted by like numerals as of the first embodiment and will not be further described.

Modification of First Embodiment

Figure 8:
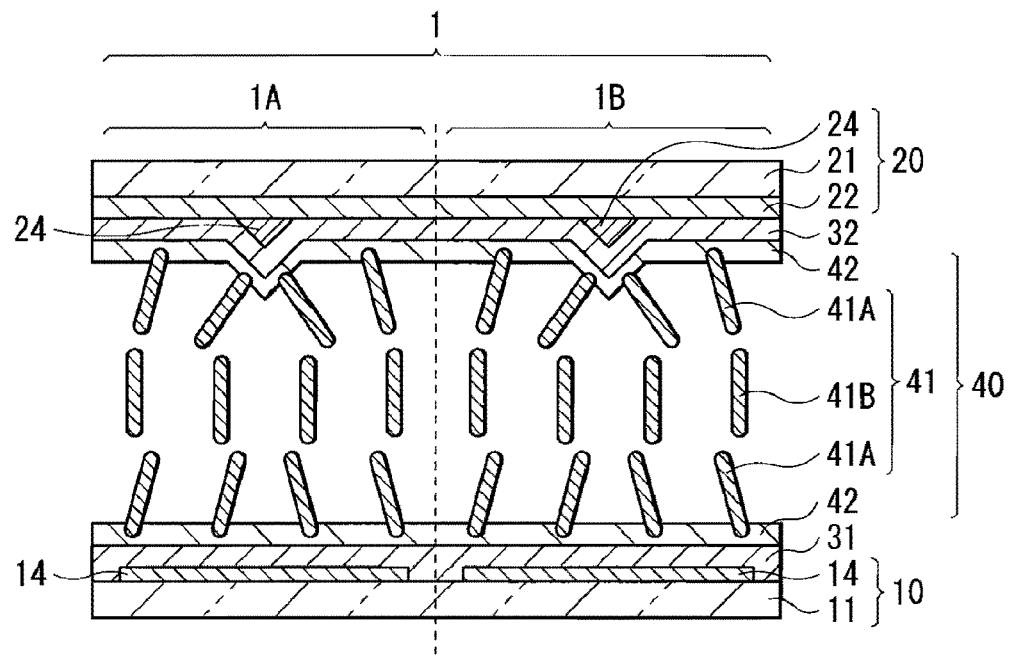
FIG. 8 is a schematic sectional view of a liquid crystal display device according to a modification of FIG. 1.
Figure 9A:
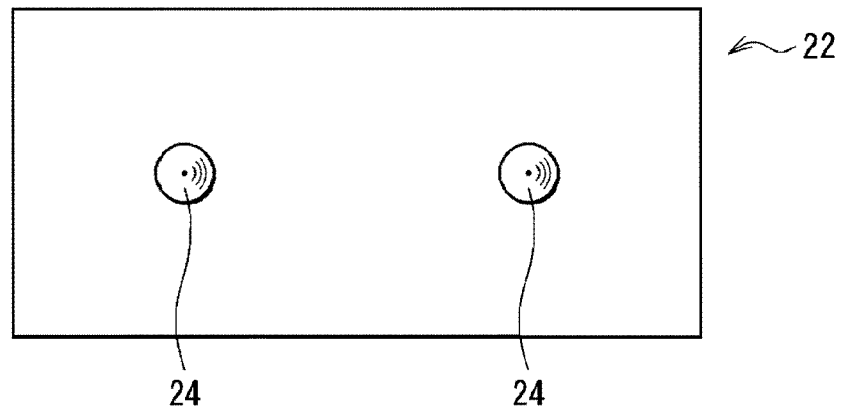
FIGS. 9A and 9B are schematic plan views of a pixel electrode, a common electrode and projections illustrated in FIG. 8.
Figure 9B:
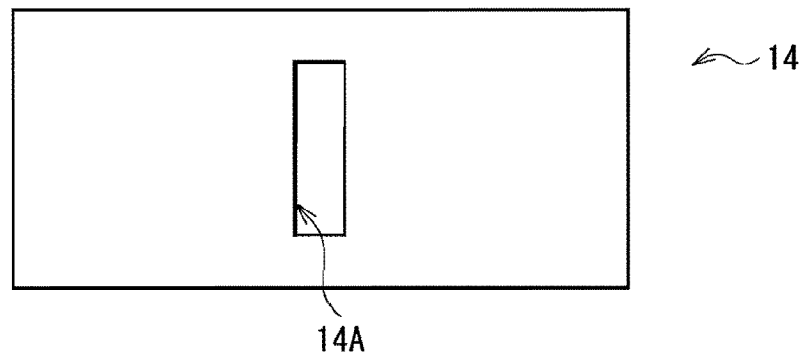

FIG. 8 is a schematic sectional view of a liquid crystal display device according to a modification of the first embodiment, and FIGS. 9A and 9B are a schematic plan view of the common electrode 22 used in the liquid crystal display device illustrated in FIG. 8 and projections 24 arranged on the common electrode 22 (FIG. 9A) and a schematic plan view of a pixel electrode 14 (FIG. 9B). The liquid crystal display device has the same configuration as that of the liquid crystal display device according to the first embodiment except that the pixel electrode substrate 10 includes the pixel electrode 14 including a slit 14A, and the facing electrode substrate 20 includes the projections 24 on a surface on the liquid crystal layer 40 side of the common electrode 22.

The pixel electrode 14 includes the slit 14A so that 1 pixel is divided into a region 1A and a region 1B. The projections 24 are arranged between the alignment film 32 and the common electrode 22 so as to face the centers of the regions 1A and 1B of the pixel electrode 14.

In the liquid crystal layer 40 in this case, the liquid crystal molecules 41A positioned in proximity to the projections 24 are favorably controlled by the polymer compound 42, and are aligned so as to be radially tilted from the projections 24 as centers. Thereby, when a drive voltage is applied, in the region 1A and the region 1B, the liquid crystal molecules 41 respond so as to radially fall down from the tops of the projections 24 as centers.

In the liquid crystal display device, when a drive voltage is applied between the pixel electrode 14 and the common electrode 22 on the basis of image data, the liquid crystal molecules 41 in the liquid crystal layer 40 respond to radially fall down, and light is modulated and transmitted, thereby display is performed.

Moreover, in the liquid crystal display device, the projections 24 are arranged between the alignment film 32 and the common electrode 22, and the pixel electrode 14 including the slit 14A is included, and the polymer compound 42 included in the liquid crystal layer 40 includes the structure represented by Chemical Formula 2, so the alignment of the liquid crystal molecules 41A are favorably controlled so that the liquid crystal molecules 41A have a predetermined pretilt angle θ, and the alignment of the liquid crystal molecules 41 is stabilized. Therefore, compared to the case where the structure represented by Chemical Formula 2 is not included, display unevenness is less likely to occur, and configurational stability is secured, and responsivity is improved. In this case, the liquid crystal molecules 41 respond to radially fall down, so when the circular polarizing plate is used, light transmission loss is minimized, and a liquid crystal display device with high (bright) light transmittance is achieved.

Other functions and effects are the same as those in the liquid crystal display device according to the first embodiment of the invention.

Second Embodiment

Figure 10A:
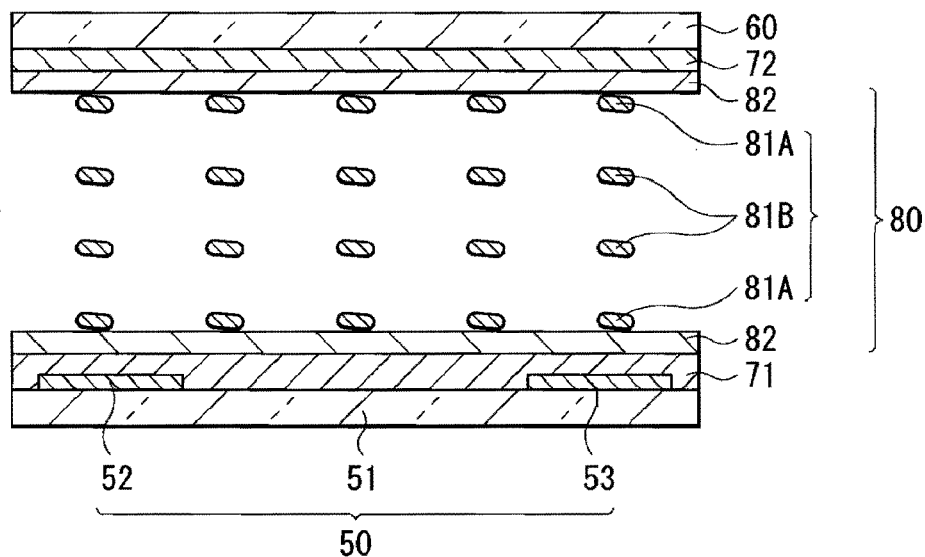
FIGS. 10A and 10B are schematic sectional views of a liquid crystal display device according to a second embodiment of the invention.
Figure 10B:
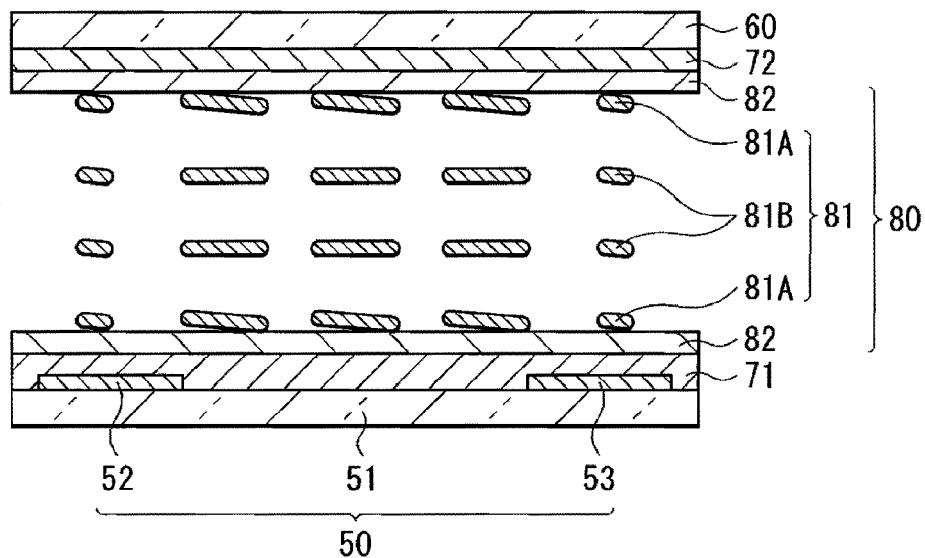

FIGS. 10A and 10B are schematic sectional views of a liquid crystal display device according to a second embodiment. FIG. 10A illustrates a state in which a drive voltage is not applied, and FIG. 10B illustrates a state in which a drive voltage is applied. The display mode of the liquid crystal display device illustrated in FIGS. 10A and 10B is a so-called IPS mode. For example, as illustrated in FIGS. 10A and 10B, the liquid crystal display device includes an electrode substrate 50 and a facing substrate 60 which face each other, alignment films 71 and 72 which are arranged so as to be laid over surfaces facing each other of the electrode substrate 50 and the facing substrate 60, and a liquid crystal layer 80 which is sealed between the electrode substrate 50 and the facing substrate 60 with the alignment films 71 and 72 in between, and the electrode substrate 50 has a configuration in which a pixel electrode 52 and a common electrode 53 are arranged. The liquid crystal display device is a transmissive liquid crystal display device, and a pair of polarizing plates (not illustrated) are arranged so that the electrode substrate 50 and the facing substrate 60 are sandwiched between the pair of polarizing plates.

The electrode substrate 50 has a configuration in which the pixel electrode 52 and the common electrode 53 are arranged in parallel at a predetermined spacing on a surface of a transparent substrate 51 on which a drive circuit (not illustrated) including a drive element is formed. The transparent substrate 51 is made of, for example, a transparent (light transmissive) material such as glass or plastic. The pixel electrode 52 and the common electrode 53 are electrodes for applying a voltage to the liquid crystal layer 80. The pixel electrode 52 and the common electrode 53 are transparent electrodes having light transmittance, and are made of a transparent electrode material such as indium tin oxide.

The facing substrate 60 has a configuration including a color filter (not illustrated) which includes red (R), green (G) and blue (B) filters arranged in stripes, and is made of a transparent (light transmissive) material such as glass or plastic.

The alignment films 71 and 72 are horizontal alignment films aligning liquid crystal molecules 81 included in the liquid crystal layer 80 in a horizontal direction with respect to a substrate surface, and are made of, for example, an organic material such as polyimide. A process of controlling the alignment of the liquid crystal molecules 81 such as rubbing may be performed on the alignment films 71 and 72.

The liquid crystal layer 80 includes liquid crystal molecules 81 and a polymer compound 82. The liquid crystal molecules 81 have a positive dielectric constant anisotropy, and have a rotationally symmetrical shape about a long axis and a short axis which are orthogonal to each other as central axes.

The polymer compound 82 is preferably present in proximity to at least one of the alignment films 71 and 72, and is preferably arranged so as to be fixed or adhered to a surface of at least one of the alignment films 71 and 72. In this case, the polymer compound 82 is arranged on both of surfaces of the alignment films 71 and 72. The polymer compound 82 controls liquid crystal molecules 81 (liquid crystal molecules 81A) in proximity to the polymer compound 82 so as to maintain the liquid crystal molecules 81, and has the same configuration as that of the polymer compound 42 in the liquid crystal display device according to the first embodiment.

In the liquid crystal layer 80, the liquid crystal molecules 81 may be classified into liquid crystal molecules 81A of which the alignment is controlled so as to be maintained by the polymer compound 82 in proximity to interfaces with the alignment films 71 and 72, and liquid crystal molecules 81B other than the liquid crystal molecules 81A. The liquid crystal molecules 81B are positioned in a middle region in a thickness direction of the liquid crystal layer 80. In a state in which a drive voltage is not applied (refer to FIG. 10A), the liquid crystal molecules 81A and 81B are aligned so that the long axis directions of the liquid crystal molecules 81A and 81B are tilted (at approximately 20°) with respect to the pixel electrode 52 and the common electrode 53, and are aligned substantially horizontally to surfaces of the electrode substrate 50 and the facing substrate 60.

The liquid crystal display device may be manufactured by the following steps, for example.

First, for example, the electrode substrate 50 in which the pixel electrode 52 and the common electrode 53 are arranged in parallel at a predetermined spacing on the transparent substrate 51, and the facing substrate 60 are prepared. Next, the alignment films 71 and 72 are formed by coating a surface on which the pixel electrode 52 and the common electrode 53 are arranged of the electrode substrate 50 and one surface of the facing substrate 60 with a horizontal alignment agent or printing and firing horizontal alignment films on the substrates.

On the other hand, as the material of the liquid crystal layer 80, a liquid crystal material is prepared by mixing the liquid crystal molecules 81 and the compound represented by Chemical Formula 5, and, if necessary, the compound represented by Chemical Formula 7. At this time, if necessary, an ultraviolet absorber, a photopolymerization initiator or the like may be added to the liquid crystal material.

Next, on one of the surfaces on which the alignment films 71 and 72 are formed of the electrode substrate 50 and the facing substrate 60, a columnar projection for keeping a cell gap is formed of a resist, and a seal section is formed by coating with the sealing agent such as an epoxy adhesive by a dispenser. After that, the electrode substrate 50 and the facing substrate 60 are bonded together so that the alignment films 71 and 72 face each other. Next, the seal section except for an injection opening (a sealing opening) for injecting the liquid crystal material is cured by heating or the like. Next, the above-described liquid crystal material is injected into a space between the electrode substrate 50 and the facing substrate 60 through the injection opening, and then the sealing opening is sealed with the sealing agent or the like.

Next, the liquid crystal layer 80 is irradiated with ultraviolet light from the outside of at least one of the electrode substrate 50 and the facing substrate 60 to polymerize the monomer in the liquid crystal material, thereby the polymer compound 82 including the structure represented by Chemical Formula 2 is formed on the surfaces of the alignment films 71 and 72. Thereby, the liquid crystal display device illustrated in FIGS. 10A and 10B is completed.

In the liquid crystal display device, in a state in which a drive voltage is not applied as illustrated in FIG. 10A, the liquid crystal molecules 81 in the liquid crystal layer 80 are tilted (at approximately 20°) with respect to the pixel electrode 52 and the common electrode 53, and are aligned substantially horizontally to the surfaces of the electrode substrate 50 and the facing substrate 60. As illustrated in FIG. 10B, when a drive voltage is applied between the pixel electrode 52 and the common electrode 53 on the basis of image data, the liquid crystal molecules 81 in the liquid crystal layer 80 are aligned substantially horizontally to the surfaces of the electrode substrate 50 and the facing substrate 60, and respond by rotating so as to be orthogonal to the pixel electrode 52 and the common electrode 53. Thereby, light is modulated and transmitted to perform display.

Moreover, in the liquid crystal display device, the polymer compound 82 included in the liquid crystal layer 80 includes the structure represented by Chemical Formula 2, so compared to the case where the structure represented by Chemical Formula 2 is not included, without loss of responsivity, display unevenness is less likely to occur, and configurational stability is secured. In addition, examples of the above-described case where the structure represented by Chemical Formula 2 is not included include the case where the liquid crystal layer does not include the polymer compound, and the case where a polymer compound not including the structure represented by Chemical Formula 2 is included.

In particular, when the polymer compound 82 further includes the structure represented by Chemical Formula 4, display unevenness is less likely to occur, and higher configurational stability is secured, and high responsivity is obtained.

In addition, in an IPS mode liquid crystal display device in related art, in the case where a physical pressure is applied to a substrate to change a cell gap, a phenomenon in which liquid crystal molecules are misaligned, and misaligned liquid crystal molecules do not returned to the original state easily occurs. Therefore, in the case where the IPS mode liquid crystal display device in related art is mounted in a touch panel I/O display, it is necessary for the touch panel I/O display to have a configuration in which a physical pressure is not applied to a substrate surface of the liquid crystal display device, so it is difficult to reduce the profile of the display. On the other hand, in the liquid crystal display device according to the embodiment, the polymer compound 82 includes the structure represented by Chemical Formula 2, so the alignment of the liquid crystal molecules 81A is strongly controllable. Thereby, even if a physical pressure (an external pressure) is applied to a substrate surface (outside surfaces of the electrode substrate 50 and the facing substrate 60) to cause misalignment of the liquid crystal molecules 81, the misaligned liquid crystal molecules 81 rapidly return to the original state. In other words, in the case where the liquid crystal display device according to the embodiment is mounted in the touch panel I/O display, the liquid crystal display device has higher configurational stability than the liquid crystal display device in related art, so the liquid crystal display device according to the embodiment contributes to a reduction in the profile of the display.

Third Embodiment

Figure 11A:
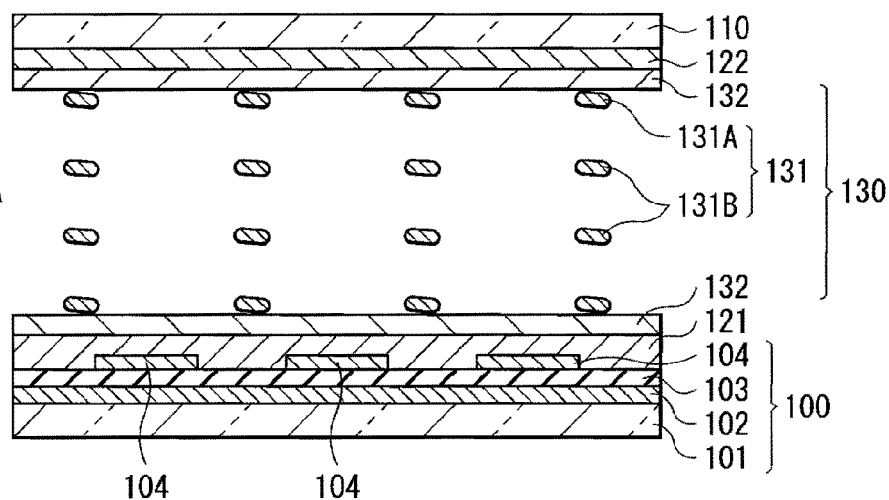
FIGS. 11A and 11B are schematic sectional views of a liquid crystal display device according to a third embodiment of the invention.
Figure 11B:
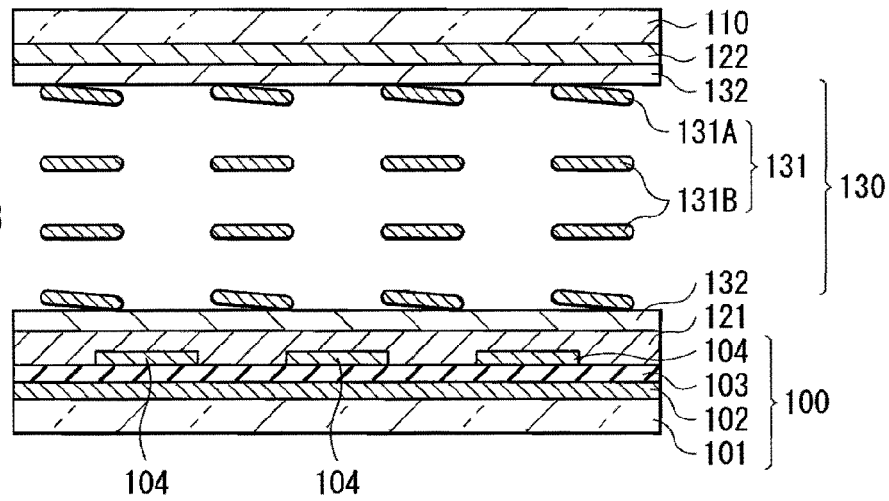
Figure 12:
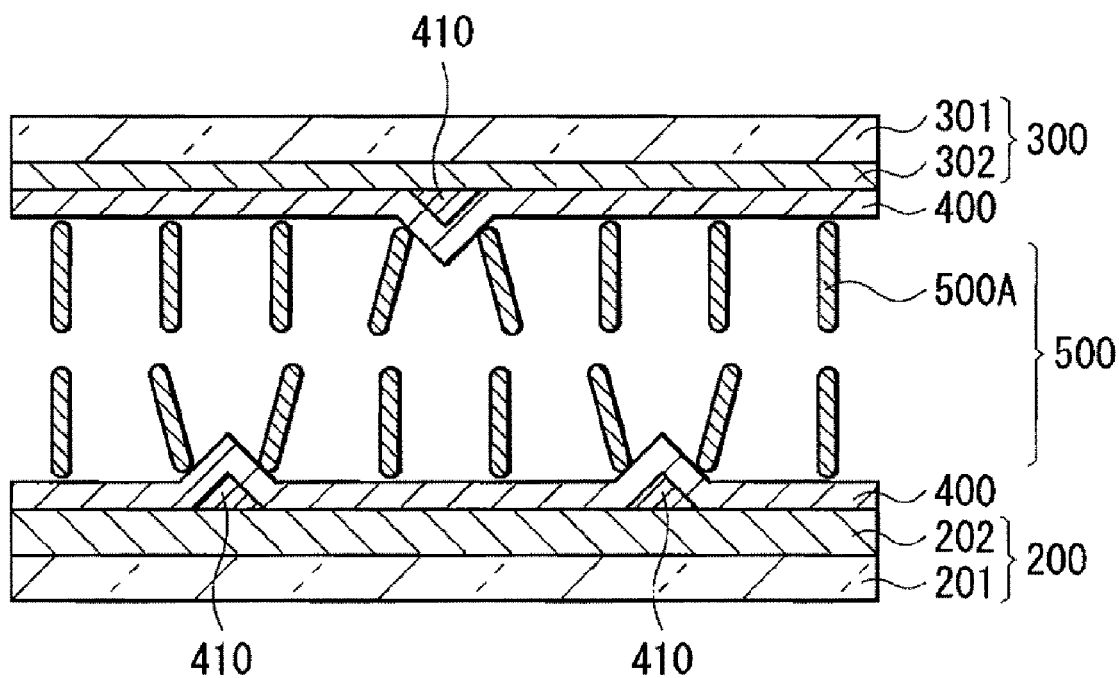
FIG. 12 is a sectional view for describing a liquid crystal display device in related art.

FIGS. 11A and 11B are schematic sectional views of a liquid crystal display device according to a third embodiment. FIG. 11A illustrates a state in which a drive voltage is not applied, and FIG. 11B illustrates a state in which a drive voltage is applied. The display mode of the liquid crystal display device illustrated in FIGS. 11A and 11B is a so-called FFS mode. For example, as illustrated in FIGS. 11A and 11B, the liquid crystal display device includes an electrode substrate 100 and a facing substrate 110 which face each other, alignment films 121 and 122 which are arranged so as to be laid over surfaces facing each other of the electrode substrate 100 and the facing substrate 110, and a liquid crystal layer 130 which is sealed between the electrode substrate 100 and the facing substrate 110 with the alignment films 121 and 122 in between, and the electrode substrate 100 has a configuration in which a common electrode 102 and a pixel electrode 104 are arranged. The liquid crystal display device is a transmissive liquid crystal display device, and a pair of polarizing plates (not illustrated) are arranged so that the electrode substrate 100 and the facing substrate 110 are sandwiched between the pair of polarizing plates.

The electrode substrate 100 has a configuration in which a common electrode 102 is arranged on a surface of a transparent substrate 101 on which a drive circuit including a drive element is formed, and pixel electrodes 104 are arranged in stripes on the common electrode 102 with an insulating film 103 in between. The transparent substrate 101 is made of, for example, a transparent (light transmissive) material such as glass or plastic. The common electrode 102 and the pixel electrodes 104 are electrodes for applying a voltage to the liquid crystal layer 130. The common electrode 102 and the pixel electrodes 104 are, for example, transparent electrodes having light transmittance, and are made of a transparent electrode material such as indium tin oxide. The insulating film 103 is arranged between the common electrode 102 and the pixel electrodes 104, and is made of an insulating material.

The facing substrate 110 has a configuration including a color filter (not illustrated) which includes red (R), green (G) and blue (B) filters arranged in stripes, and is made of a transparent (light transmissive) material such as glass or plastic.

The alignment films 121 and 122 are horizontal alignment films aligning liquid crystal molecules 131 included in the liquid crystal layer 130 in a horizontal direction with respect to a substrate surface, and are made of, for example, an organic material such as polyimide. A process of controlling the alignment of the liquid crystal molecules 131 such as rubbing is further performed on the alignment films 121 and 122.

The liquid crystal layer 130 includes liquid crystal molecules 131 and a polymer compound 132. The liquid crystal molecules 131 have a positive dielectric constant anisotropy, and have a rotationally symmetrical shape about a long axis and a short axis which are orthogonal to each other as central axes.

The polymer compound 132 is preferably present in proximity to at least one of the alignment films 121 and 122, and is preferably arranged so as to be fixed or adhered to a surface of at least one of the alignment films 121 and 122. In this case, the polymer compound 132 is arranged on both of surfaces of the alignment films 121 and 122. The polymer compound 132 controls the alignment of liquid crystal molecules 131 (liquid crystal molecules 131A) in proximity to the polymer compound 132 so as to maintain the liquid crystal molecules 131, and has the same configuration as that of the polymer compound 42 in the liquid crystal display device according to the first embodiment and that of the polymer compound 82 in the liquid crystal display according to the second embodiment.

In the liquid crystal layer 130, the liquid crystal molecules 131 may be classified into liquid crystal molecules 131A of which the alignment is controlled so as to be maintained by the polymer compound 132 in proximity to interfaces with the alignment films 121 and 122, and liquid crystal molecules 131B other than the liquid crystal molecules 131A. The liquid crystal molecules 131B are positioned in a middle region in a thickness direction of the liquid crystal layer 130. In a state in which a drive voltage is not applied (refer to FIG. 11A), the liquid crystal molecules 131A and 131B are aligned so that the long axis direction of the liquid crystal molecules 131A and 131B are tilted (at approximately 10°) with respect to each pixel electrode 104, and are aligned substantially horizontally to surfaces of the electrode substrate 100 and the facing substrate 110.

The liquid crystal display device may be manufactured by the following steps, for example.

First, for example, the electrode substrate 100 in which the common electrode 102, the insulating film 103 and the pixel electrodes 104 are arranged on a surface of the transparent substrate 101, and the facing substrate 110 are prepared. Next, the alignment films 121 and 122 are formed on a surface on which the pixel electrodes 104 are arranged of the electrode substrate 100 and one surface of the facing substrate 110 by printing and firing horizontal alignment films on the substrates.

On the other hand, as the material of the liquid crystal layer 130, a liquid crystal material is prepared by mixing the liquid crystal molecules 131 and the compound represented by Chemical Formula 5, and, if necessary, the compound represented by Chemical Formula 7. At this time, if necessary, an ultraviolet absorber, a photopolymerization initiator or the like may be added to the liquid crystal material.

Next, on one of the surfaces on which the alignment films 121 and 122 are formed of the electrode substrate 100 and the facing substrate 110, a columnar projection for keeping a cell gap is formed of a resist, and a seal section is formed by coating with the sealing agent such as an epoxy adhesive by a dispenser. After that, the electrode substrate 100 and the facing substrate 110 are bonded together so that the alignment films 121 and 122 face each other. Next, the seal section except for an injection opening (a sealing opening) for injecting the liquid crystal material is cured by heating or the like. Next, the above-described liquid crystal material is injected into a space between the electrode substrate 100 and the facing substrate 110 through the injection opening, and then the sealing opening is sealed with the sealing agent or the like.

Next, the liquid crystal layer 130 is irradiated with ultraviolet light from the outside of at least one of the electrode substrate 100 and the facing substrate 110 to polymerize the monomer in the liquid crystal material, thereby the polymer compound 132 including the structure represented by Chemical Formula 2 is formed on the surfaces of the alignment films 121 and 122. Thereby, the liquid crystal display device illustrated in FIGS. 11A and 11B is completed.

In the liquid crystal display device, in a state in which a drive voltage is not applied as illustrated in FIG. 11A, the liquid crystal molecules 131 in the liquid crystal layer 130 are tilted (at approximately 10°) with respect to each pixel electrode 104, and are aligned substantially horizontally to the surfaces of the electrode substrate 100 and the facing substrate 110. As illustrated in FIG. 11B, when a drive voltage is applied between the pixel electrode 104 and the common electrode 102 on the basis of image data, the liquid crystal molecules 131 in the liquid crystal layer 130 are aligned substantially horizontally to the surfaces of the electrode substrate 100 and the facing substrate 110, and respond by rotating so as to be orthogonal to each pixel electrode 104. Thereby, light is modulated and transmitted to perform display.

Moreover, in the liquid crystal display device, the polymer compound 132 included in the liquid crystal layer 130 includes the structure represented by Chemical Formula 2, so compared to the case where the structure represented by Chemical Formula 2 is not included, without loss of responsivity, display unevenness is less likely to occur, and configurational stability is secured. In addition, examples of the above-described case where the structure represented by Chemical Formula 2 is not included include the case where the liquid crystal layer does not include the polymer compound, and the case where a polymer compound not including the structure represented by Chemical Formula 2 is included.

In particular, when the polymer compound 132 further includes the structure represented by Chemical Formula 4, display unevenness is less likely to occur, and higher configurational stability is secured, and high responsivity is obtained.

In addition, in an FFS mode liquid crystal display device in related art, as in the case of the IPS mode liquid crystal display device, in the case where a physical pressure is applied to a substrate to change a cell gap, a phenomenon in which liquid crystal molecules are misaligned, and misaligned liquid crystal molecules do not return to the original state easily occurs. On the other hand, in the liquid crystal display device according to the embodiment, the polymer compound 132 includes the structure represented by Chemical Formula 2, so the alignment of the liquid crystal molecules 131A is strongly controllable. Thereby, even if a physical pressure (external pressure) is applied to a substrate surface to cause misalignment of the liquid crystal molecules 131, the misaligned liquid crystal molecules 131 rapidly return to the original state. In other words, in the case where the liquid crystal display device according to the embodiment is mounted in the touch panel I/O display, the liquid crystal display device has higher configurational stability than the liquid crystal display device in related art, so the liquid crystal display device according to the embodiment contributes to a reduction in the profile of the display.

EXAMPLES

Examples of the present invention will be described in detail below.

Example 1-1

The VA mode liquid crystal display device illustrated in FIG. 8 was formed by the following steps.

First, the pixel electrode substrate 10 in which the pixel electrode 14 was arranged on the transparent substrate 11, and the facing electrode substrate 20 in which the common electrode 22 and the projections 24 were arranged on the transparent substrate 21 were prepared. At that time, as the pixel electrode substrate 10, the pixel electrode substrate 10 on which the pixel electrode 14 with a size of 45 μm×106 μm including the slit 14A with a width of 6 μm was arranged was used. Moreover, as the facing electrode substrate 20, the facing electrode substrate 20 including the projections with a diameter of 12 μm was used. Next, surfaces of the pixel electrode 14, the common electrode 22 and the projections 24 were coated with a vertical alignment agent (available from JSR Corporation), and after that, the vertical alignment agent was fired to form the alignment films 31 and 32.

Next, a negative liquid crystal having a negative dielectric constant anisotropy (available from Merck Japan Ltd.) and the compound represented by Chemical Formula 6(1) as the compound represented by Chemical Formula 5 as a monomer were mixed to form a liquid crystal material. At that time, the monomer was dissolved in the liquid crystal material so that the content of the monomer in the liquid crystal material was 0.4 wt %.

Next, a columnar spacer made of a resist for securing a cell gap was formed on a surface on which the alignment film 31 was formed of the pixel electrode substrate 10, and a seal section was formed by coating the surface of the pixel electrode substrate 10 with a sealing agent by a dispenser. After that, the pixel electrode substrate 10 and the facing electrode substrate 20 were bonded together so that the alignment films 31 and 32 faced each other. Next, the seal section except for an injection opening for injecting the liquid crystal material was cured by heating. Next, the liquid crystal material was injected into a space between the pixel electrode substrate 10 and the facing electrode substrate 20 through the injection opening, and then the injection opening was sealed with a sealing agent.

Next, a voltage was applied between the pixel electrode 14 and the common electrode 22, and while that state was kept, the liquid crystal layer 40 was irradiated with ultraviolet light from the outside of the pixel electrode substrate 10 and the facing electrode substrate 20 to polymerize the monomer in the liquid crystal material, thereby to form the polymer compound 42 including the structure represented by Chemical Formula 3(1) on the surfaces of the alignment films 31 and 32. At that time, the polymer compound 42 was formed so that the pretilt angle θ of the liquid crystal molecules 41A was within a range of greater than 88° to smaller than 90° with respect to the transparent substrates 11 and 21. Thereby, the liquid crystal display device illustrated in FIG. 8 was completed.

Examples 1-2 to 1-4

Liquid crystal display devices were formed by the same steps as those in Example 1-1, except that instead of the compound represented by Chemical Formula 6(1), as the monomer, one of the compounds represented by Chemical Formulas 6(2) to 6(4) was used to form the polymer compound 42 including one of the structures represented by Chemical Formulas 3(2) to 3(4).

Example 1-5

A liquid crystal display device was formed by the same steps as those in Example 1-1, except that as the monomer, the compound represented by Chemical Formula 7 was added to form the polymer compound 42 including, the structure represented by Chemical Formula 3(1) as well as the structure represented by Chemical Formula 4. At that time, the contents of the compound represented by Chemical Formula 6(1) and the compound represented by Chemical Formula 7 in the liquid crystal material each were 0.2 wt %.

Comparative Example 1-1

A liquid crystal display device was formed by the same steps as those in Example 1-1, except that the monomer was not added to the liquid crystal material.

Comparative Examples 1-2 to 1-7

Liquid crystal display devices were formed by the same steps as those in Example 1-1, except that as the monomer, instead of the compound represented by Chemical Formula 6(1), the compound represented by Chemical Formula 7 (Comparative Example 1-2), or one of the compounds represented by Chemical Formulas 9(1) to 9(5) (Comparative Examples 1-3 to 1-7) was used to form the polymer compound including the structure represented by Chemical Formula 4 (Comparative Example 1-2) or one of the structures represented by Chemical Formulas 8(1) to 8(5).

When the display unevenness, the configurational stability and the responsivity of each of the liquid crystal display devices of Examples 1-1 to 1-5 and Comparative Examples 1-1 to 1-7 were determined, results illustrated in Table 1 were obtained.

To determine the display unevenness, display unevenness during gray-scale display was visually observed. As evaluation of the display unevenness, a liquid crystal display device in which display unevenness was not observed was indicated with "A", a liquid crystal display device in which display unevenness was slightly observed but was in an acceptable level was indicated with "B", and a liquid crystal display device in which display unevenness was obviously observed (in an unacceptable level) was indicated with "×". In addition, the display unevenness of the liquid crystal display device of Comparative Example 1-1 was not evaluated.

The configurational stability was evaluated by a misalignment elimination gray level test when the display surface was pressed, and alignment stability was evaluated by a burn-in test and a storage test. To perform the misalignment elimination gray level test when the display surface was pressed, the surface of the transparent substrate 21 of the liquid crystal display device was scrubbed by a stylus, and a gray-scale level at which the misalignment of liquid crystal molecules was eliminated was checked among gray-scale levels from a 8/8 gray-scale level (a white level) to a 1/8 gray-scale level (black display). In addition, misalignment easily remained in a gray-scale level closer to the white level, and a 4/8 gray-scale level was considered as a "pass" level of the misalignment elimination gray level. In other words, gray-scale levels from the 1/8 gray-scale level to the 3/8 gray-scale level were considered as "fail" levels. Moreover, to perform a burn-in test, in an atmosphere at 65° C., a black/white checker pattern was displayed for 2 hours, and then a gray scale was displayed to check a burn-in state. To perform a storage test, the initial response time was measured, and a response time after storage for 500 hours in an atmosphere at 85° C. was measured, and a comparison between the initial response time and the response time after storage was performed. As evaluation of alignment stability, a liquid crystal display device in which there was little difference between the initial response time and the response time after storage (at 85° C. after 500 hours) in the storage test, and burn-in was hardly observed in the burn-in test was indicated with "A", a liquid crystal display device in which there was little difference between the initial response time and the response time after storage in the storage test, and burn-in was slightly observed in the burn-in test was indicated with "B", a liquid crystal display device in which the response after storage was slightly longer in the storage test, and burn-in was observed in the burn-in test but was in an acceptable level was indicated with "C", and a liquid crystal display device in which the response time after storage was much longer in the storage test, and burn-in obviously occurred (in an unacceptable level) in the burn-in test was indicated with "×". The alignment stability of the liquid crystal display device of Comparative Example 1 was not evaluated.

To determine the responsivity, a drive voltage of 2.8 V was applied, and the response time was measured to check response improvement. As evaluation of the response improvement, a liquid crystal display device of which the response time was reduced to 50% or over of the response time of Comparative Example 1-1 was indicated with "S", a liquid crystal display device of which the response time was reduced to a range of 40% to smaller than 50% of the response time of Comparative Example 1-1 was indicted with "A", a liquid crystal display device of which the response time was reduced to a range of 20% to smaller than 40% of the response time of Comparative Example 1-1 was indicated with "B", a liquid crystal display device of which the response time was reduced to a range of 10% to smaller than 20% of the response time of Comparative Example 1-1 was indicated with "C", and a liquid crystal display device of which the response time was reduced to smaller than 10% or was not reduced at all (in an unacceptable level) was indicated with "×".

TABLE 1

| | LIQUID CRYSTAL LAYER POLYMER COMPOUND (STRUCTURE) | DISPLAY UNEVENNESS | CONFIGURATIONAL STABILITY | | RESPONSIVITY RESPONSE IMPROVEMENT |
|---|---|---|---|---|---|
| | | | MISALIGNMENT ELIMINATION LEVEL | ALIGNMENT STABILITY | |
| EXAMPLE 1-1 | CHEMICAL FORMULA 3(1) | A | 7/8 | A | A |
| EXAMPLE 1-2 | CHEMICAL FORMULA 3(2) | A | 7/8 | B | A |
| EXAMPLE 1-3 | CHEMICAL FORMULA 3(3) | A | 6/8 | C | B |
| EXAMPLE 1-4 | CHEMICAL FORMULA 3(4) | B | 4/8 | C | C |
| EXAMPLE 1-5 | CHEMICAL FORMULA 3(1) + CHEMICAL FORMULA 4 | A | 8/8 | A | S |
| COMPARATIVE EXAMPLE 1-1 | — | — | 3/8 | — | — |
| COMPARATIVE EXAMPLE 1-2 | CHEMICAL FORMULA 4 | × | 8/8 | A | S |
| COMPARATIVE EXAMPLE 1-3 | CHEMICAL FORMULA 8(1) | × | 4/8 | B | X |
| COMPARATIVE EXAMPLE 1-4 | CHEMICAL FORMULA 8(2) | × | 5/8 | B | B |
| COMPARATIVE EXAMPLE 1-5 | CHEMICAL FORMULA 8(3) | × | 3/8 | × | X |
| COMPARATIVE EXAMPLE 1-6 | CHEMICAL FORMULA 8(4) | × | 4/8 | C | X |
| COMPARATIVE EXAMPLE 1-7 | CHEMICAL FORMULA 8(5) | × | 4/8 | C | X |

As illustrated in Table 1, in Examples 1-1 to 1-5 in which the liquid crystal layer 40 included one of the structures represented by Chemical Formulas 3(1) to 3(4), the evaluation of the display unevenness, the misalignment elimination gray level and the alignment stability was in an acceptable level or higher, and the response time was reduced to 10% or over of the response time of Comparative Example 1-1. On the other hand, in Comparative Examples 1-2 to 1-7, some of the misalignment elimination gray level, the alignment stability and response improvement reached an acceptable level, but display unevenness occurred. This result indicated that in the polymer compound including the structure represented by Chemical Formula 4 (which was a methacrylate-based structure but included a biphenyl skeleton not including an alkyl group) which was similar to but different from the structure represented by Chemical Formula 2, the structures represented by Chemical Formulas 8(1) and 8(2) (acrylate-based polymer compounds), or the structure represented by Chemical Formula 8(3) (which was a methacrylate-based polymer compound in which the position of an alkyl group of a biphenyl skeleton was different), the liquid crystal layer was likely to be nonuniformly formed, or the alignment control force was low. Moreover, it was suggested from a comparison between Example 1-1 and Comparative Example 1-3 and a comparison between Comparative Examples 1-2 and 1-4 that the methacrylate-based polymer compound controlled the alignment of liquid crystal molecules more strongly than the acrylate-based polymer compound. In other words, this result indicated that when the polymer compound 42 included the structure represented by Chemical Formula 2, the polymer compound 42 was distributed more evenly in an in-plane direction, and exerted a high alignment control force.

Therefore, it was confirmed that in the VA mode liquid crystal display device, when the polymer compound 42 including the structure represented by Chemical Formula 2 in the liquid crystal layer 40 was formed on the surfaces of the alignment films 31 and 32, without loss of responsivity, display unevenness was less likely to occur, and configurational stability was secured. Moreover, it was confirmed that when the alignment of the liquid crystal molecules 41A was controlled by the polymer compound 42 so that the pretilt angle of the liquid crystal molecules 41A was within a range of greater than 88° to smaller than 90°, responsivity was improved.

Moreover, from a comparison among Examples 1-1 to 1-4, when m and n in Chemical Formula 2 each were 3 or less, the evaluation of display unevenness, the misalignment elimination gray level and alignment stability was further improved, and when m and n each were 1, the evaluation was particularly improved.

Therefore, it was confirmed that when the polymer compound 42 included the structure in which m and n in Chemical Formula 2 each were 3 or less, higher effects were obtained, and when the polymer compound 42 included the structure in which m and n each were 1, particularly high effects were obtained.

Moreover, in a comparison between Example 1-1 and Example 1-5, when the polymer compound 42 further included the structure represented by Chemical Formula 4 (Example 1-5), the evaluation of display unevenness, the misalignment elimination gray level and the alignment stability was higher. Therefore, it was confirmed that when the polymer compound 42 included the structure represented by Chemical Formula 2 and the structure represented by Chemical Formula 4, higher effects were obtained.

Example 2

Next, a FFS mode liquid crystal display device illustrated in FIGS. 11A and 11B was formed.

First, the electrode substrate 100 in which the common electrode 102, the insulating film 103 and the pixel electrodes 104 were arranged on one surface of the transparent substrate 101, and the facing substrate 110 were prepared. Next, a surface on which the pixel electrode 104 was formed of the electrode substrate 100 and one surface of the facing substrate 110 were coated with a horizontal alignment agent (available from JSR Corporation), and then the horizontal alignment agent was fired to form the alignment films 121 and 122.

Next, a positive liquid crystal (available from Chisso Corporation) and the compound represented by Chemical Formula 6(1) as a monomer were mixed to prepare the liquid crystal material. At that time, the monomer was dissolved in the liquid crystal material so that the content of the monomer in the liquid crystal material was 0.4 wt %.

Next, a columnar spacer made of a resist for securing a cell gap was formed on a surface on which the alignment film 121 was formed of the electrode substrate 100, and the surface of the electrode substrate 100 was coated with a sealing agent by a dispenser to form the seal section. After that, the electrode substrate 100 and the facing substrate 110 were bonded together so that the alignment films 121 and 122 faced each other. Next, the seal section except for an injection opening for injecting the liquid crystal material was cured by heating. Next, the liquid crystal material was injected into a space between the electrode substrate 100 and the facing substrate 110 through the injection opening, and then the injection opening was sealed with the sealing agent.

Next, in a state in which a voltage was not applied between the common electrode 102 and the pixel electrode 104, the liquid crystal layer 130 was irradiated with ultraviolet light from the outside of the electrode substrate 100 and the facing substrate 110 to polymerize the monomer in the liquid crystal material, thereby the polymer compound 132 including the structure represented by Chemical Formula 3(1) was formed on the surfaces of the alignment films 121 and 122. Thereby, the liquid crystal display device illustrated in FIGS. 11A and 11B was completed.

Comparative Example 2

A liquid crystal display device was formed by the same steps as those in Example 2, except that the monomer was not added to the liquid crystal material.

The display unevenness, the configurational stability and the responsivity of each of the liquid crystal display devices of Example 2 and Comparative Example 2 were determined as in the case of Example 1-1 or the like.

As a result, the same results as those in Table 1 were obtained in the FFS mode liquid crystal display device. In other words, in Example 2, the display unevenness did not occur, and the alignment stability was indicated with "A", and the misalignment elimination gray level was the 8/8 gray-scale level, and the misalignment of liquid crystal molecules 131 disappeared in every gray-scale level. Moreover, in Example 2, the response time was reduced more than that of Comparative Example 2. On the other hand, in Comparative Example 2, display unevenness was not observed, and the misalignment elimination gray level was the 5/8 gray-scale level, thereby as the FFS mode liquid crystal display device, the liquid crystal display device of Comparative Example 2 did not reach an acceptable level.

Therefore, it was confirmed that in the FFS mode liquid crystal display device, when the polymer compound 132 including the structure represented by Chemical Formula 2 in the liquid crystal layer 130 was formed on the surfaces of the alignment films 121 and 122, without loss of responsivity, the display unevenness was less likely to occur, and the configurational stability was secured.

Although the present invention is described referring to the embodiments and the examples, the invention is not limited thereto, and may be variously modified. For example, in the above-described embodiments and the above-described examples, the case where the liquid crystal display device of the invention is applied to a VA mode liquid crystal display device, an IPS mode liquid crystal display device and an FFS mode liquid crystal display device is described. However, the invention is not specifically limited to the case, and the invention may be applied to a TN mode liquid crystal display device, an MVA (Multi-domain Vertical Alignment) mode liquid crystal display device, or the like.

Moreover, in the above-described embodiments and the above-described examples, the liquid crystal display device of the invention is applied to a transmissive liquid crystal display device. However, the invention is not specifically limited to the transmissive liquid crystal display device, and may be applied to, for example, a reflective liquid crystal display device. In the reflective liquid crystal display device, a pixel electrode is made of an electrode material having light reflectivity such as aluminum.

The present application contains subject matter related to that disclosed in Japanese Priority Patent Application JP 2008-113697 filed in the Japanese Patent Office on Apr. 24, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display device comprising:
    a liquid crystal layer including liquid crystal molecules and a polymer compound including a structure represented by Chemical Formula 1; and
    a pair of substrates facing each other with the liquid crystal layer in between,

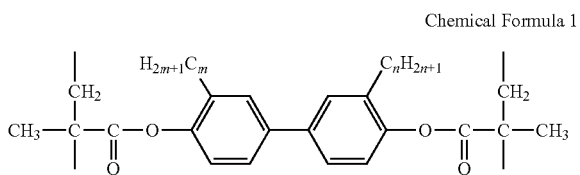

Chemical Formula 1 where m and n each are an integer of 1 to 4 both inclusive.

2. The liquid crystal display device according to claim 1, wherein
    the polymer compound is present in proximity to at least one of the pair of substrates.

3. The liquid crystal display device according to claim 1, wherein
    an alignment film is provided between each of the pair of substrates and the liquid crystal layer, and
    the polymer compound is fixed to the alignment films.

4. The liquid crystal display device according to claim 1, wherein
    m and n in Chemical Formula 1 each are 3 or less.

5. The liquid crystal display device according to claim 1, wherein
    the polymer compound further includes a structure represented by Chemical Formula 2,

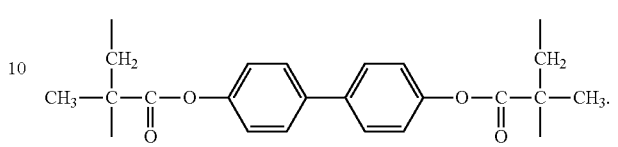

Chemical Formula 2

6. The liquid crystal display device according to claim 1, wherein
    one of the pair of substrates includes a pixel electrode, and the other includes a common electrode, and
    the liquid crystal layer has a negative dielectric constant anisotropy, and includes liquid crystal molecules with pretilt angles of greater than 88° and smaller than 90° with respect to surfaces of the pair of substrates.

7. The liquid crystal display device according to claim 6, wherein
    the common electrode includes an aperture or a notch.

8. The liquid crystal display device according to claim 6, wherein
    the pixel electrode includes a plurality of slits at intervals.

9. The liquid crystal display device according to claim 1, wherein
    one of the pair of substrates includes a pixel electrode and a common electrode,
    the liquid crystal molecules have a positive dielectric constant anisotropy, and
    the pixel electrode and the common electrode generate a transverse electrical field including a component parallel to surfaces of the pair of substrates.

* * * * *